(12) United States Patent
Jones

(10) Patent No.: US 7,454,101 B2
(45) Date of Patent: Nov. 18, 2008

(54) TUNABLE OPTICAL DISPERSION COMPENSATORS

(75) Inventor: Richard Jones, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 11/471,050

(22) Filed: Jun. 19, 2006

(65) Prior Publication Data

US 2007/0292079 A1    Dec. 20, 2007

(51) Int. Cl.
G02B 6/26    (2006.01)
G02B 6/42    (2006.01)

(52) U.S. Cl. .......................................... 385/27; 385/31
(58) Field of Classification Search ........................ None
See application file for complete search history.

(56) References Cited

U.S. PATENT DOCUMENTS

| | | | |
|---|---|---|---|
| 5,522,004 A | 5/1996 | Djupsjobacka et al. | |
| 5,600,738 A | 2/1997 | Bergland et al. | |
| 6,137,604 A * | 10/2000 | Bergano | 398/1 |
| 6,310,993 B1 | 10/2001 | Cao et al. | |
| 6,462,850 B1 * | 10/2002 | Gehlot | 398/158 |
| 2002/0021862 A1 * | 2/2002 | Zhou et al. | 385/24 |
| 2004/0008942 A1 * | 1/2004 | Scheuer et al. | 385/39 |
| 2004/0101227 A1 * | 5/2004 | Takabayashi et al. | 385/11 |

FOREIGN PATENT DOCUMENTS

JP    2005-055882 A    3/2005

OTHER PUBLICATIONS

PCT/US2007/070846 Written Opinion and International Search Report, Oct. 22, 2007, Intel Corporation et al.
Madsen, C.K., "Subband All-Pass Filter Architectures With Applications to Dispersion and Dispersion-Slope Compensation and Continuously Variable Delay Lines," IEEE Journal on Lightwave Technology, vol. 21, No. 10, Oct. 2003, pp. 2412-2420.
Oguma, M. et al., "Multi-Channel Chromatic Dispersion Compensator Consisting of Modified Interleave Filter," Friday Morning, OFC 2003, vol. 2, pp. 710-711.
Takahashi, H. et al., "Expansion of Compensation Bandwidth of Tunable Dispersion Compensator Based on Ring Resonators," Electronic Letters, vol. 40, No. 16, Aug. 5, 2004.

(Continued)

*Primary Examiner*—Michelle R. Connelly-Cushwa
*Assistant Examiner*—Chris Chu
(74) *Attorney, Agent, or Firm*—Blakey, Sokoloff, Taylor & Zafman LLP

(57) ABSTRACT

A tunable optical dispersion compensator includes an optical input port, an input variable optical coupler, at least two optical dispersion paths, an output variable optical coupler, and an optical output port. The input variable optical coupler is coupled to selectively split portions of the optical signal received from the optical input port into each of its output ports. The optical dispersion paths are each coupled to one of the output ports of the input variable optical coupler to impart dispersion compensation to each of the split portions of the optical signal. An output variable optical coupler selectively combines the split portions of the optical signal received on its input ports from the optical dispersion paths. The optical output port is coupled to the output variable optical coupler to output a dispersion compensated optical signal.

27 Claims, 11 Drawing Sheets

OTHER PUBLICATIONS

Doerr, C.R. et al., "Four-Stage Mach-Sehnder-Type Tunable Optical Dispersion Compensator With Single-Knob Control," IEEE Photonics Technology Letters, vol. 17, No. 12, Dec. 2005, pp. 2637-2639.

Doerr, C.R. et al., "Tunable Dispersion Compenstor With Integrated Wavelength Locking," 2005 Optical Society of America.

* cited by examiner

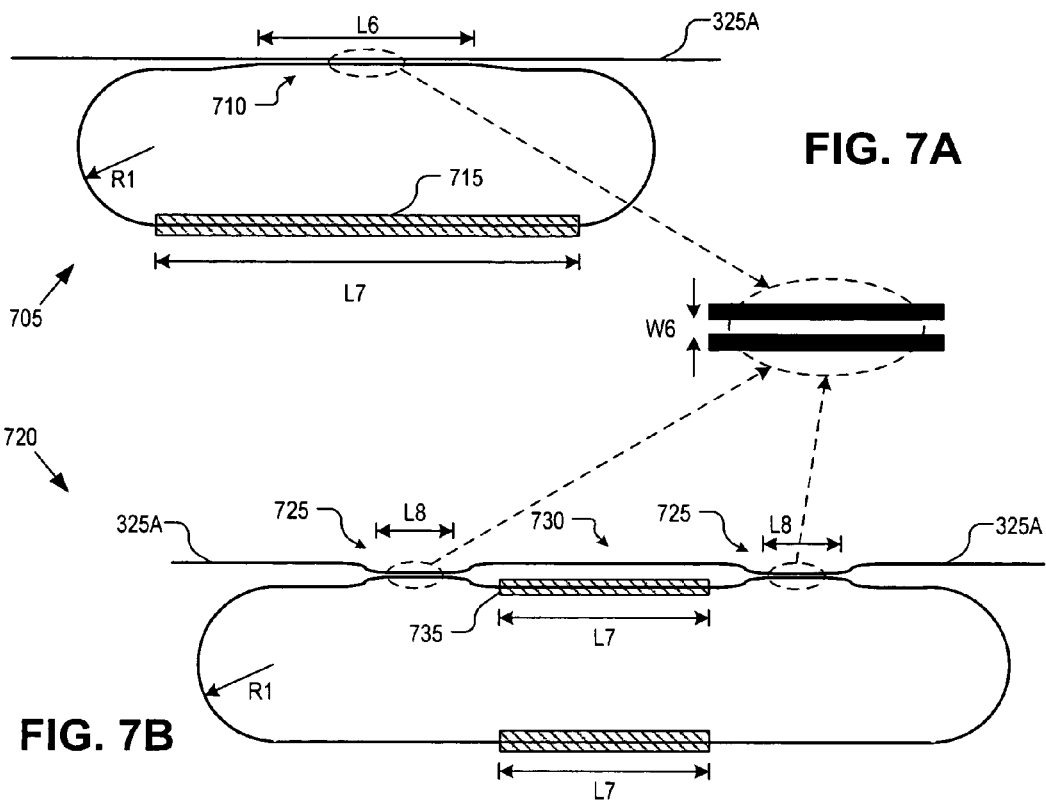
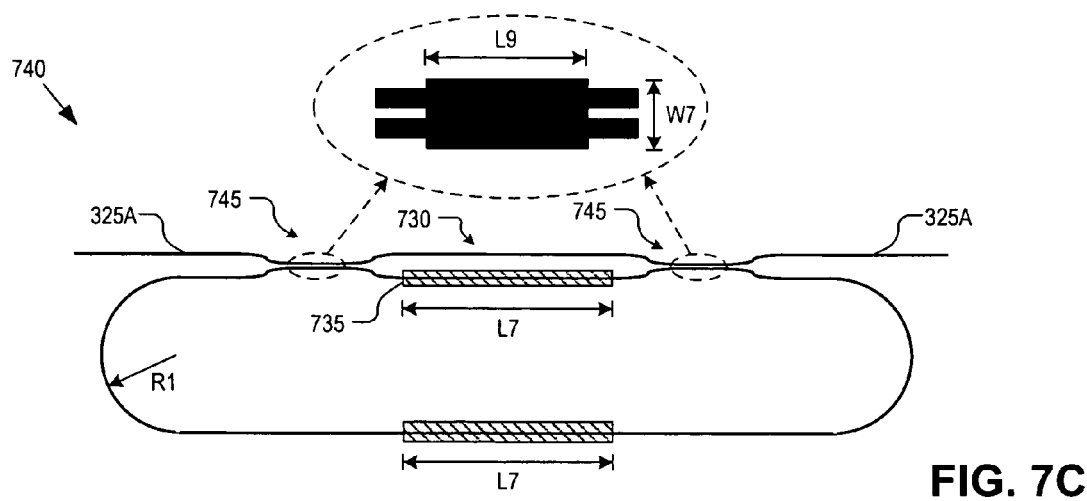
FIG. 7A
FIG. 7B
FIG. 7C

TUNABLE OPTICAL DISPERSION COMPENSATORS

TECHNICAL FIELD

This disclosure relates generally to dispersion compensation, and in particular but not exclusively, relates to integrated tunable optical dispersion compensators.

BACKGROUND INFORMATION

Chromatic or optical dispersion is a phenomenon that causes the separation of an optical wave into spectral components with different wavelengths, due to a dependence of the wave's speed on its wavelength. When an optical signal or pulse is launched into an optical communication channel (e.g., optic fiber), its envelope propagates at a group velocity along the communication channel. Since this pulse includes a range of spectral components, each spectral component travels at a slightly different group-velocity, resulting in group-velocity dispersion ("GVD"), intramodal dispersion, or simply fiber dispersion. This separation phenomenon is also commonly referred to as pulse broadening.

As the pulse travels down the optic fiber the spectral components continue to spatially and temporally separate until the pulse is so broad that the difference between a '0' bit and a '1' bit is indistinguishable on the receiving end. As the demand for greater bandwidth increases, the temporal spacing between adjacent bits continues to shrink. If the travel distance is sufficiently large, the leading edge of a pulse can spatially overlap with the trailing edge of a preceding pulse, causing the bits to blur into each other.

With wavelength-division multiplexing ("WDM") communication systems, chromatic dispersion can be particularly troublesome since this technology multiplexes multiple optical carrier signals, each having a different wavelength, on a single fiber. Since each channel or wavelength is subject to a different amount of dispersion, dispersion compensation techniques must be wavelength dependent.

As optical communication links are upgraded to higher speeds (e.g., metro links upgraded to 10 Gbits/s from 2.5 Gbits/s, new 40 Gbits/s links, etc.) dispersion is becoming the primary technical limitation. Current solutions use dispersion compensated fiber; however, this solution requires vast lengths of fiber, suffers from substantial optical loss, and is not tunable to meet the needs of WDM systems.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7A is a schematic diagram illustrating a racetrack resonator coupled to a bus waveguide via evanescent coupling, in accordance with an embodiment of the invention.

FIG. 7B is a schematic diagram illustrating a racetrack resonator coupled to a bus waveguide via dual evanescent couplers surrounding a tunable Mach-Zehnder interferometer ("MZI"), in accordance with an embodiment of the invention.

FIG. 7C is a schematic diagram illustrating a racetrack resonator coupled to a bus waveguide via dual multi-mode interference couplers surrounding a tunable MZI, in accordance with an embodiment of the invention.

DETAILED DESCRIPTION

Embodiments of apparatuses, systems, and methods for tunable optical dispersion compensation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
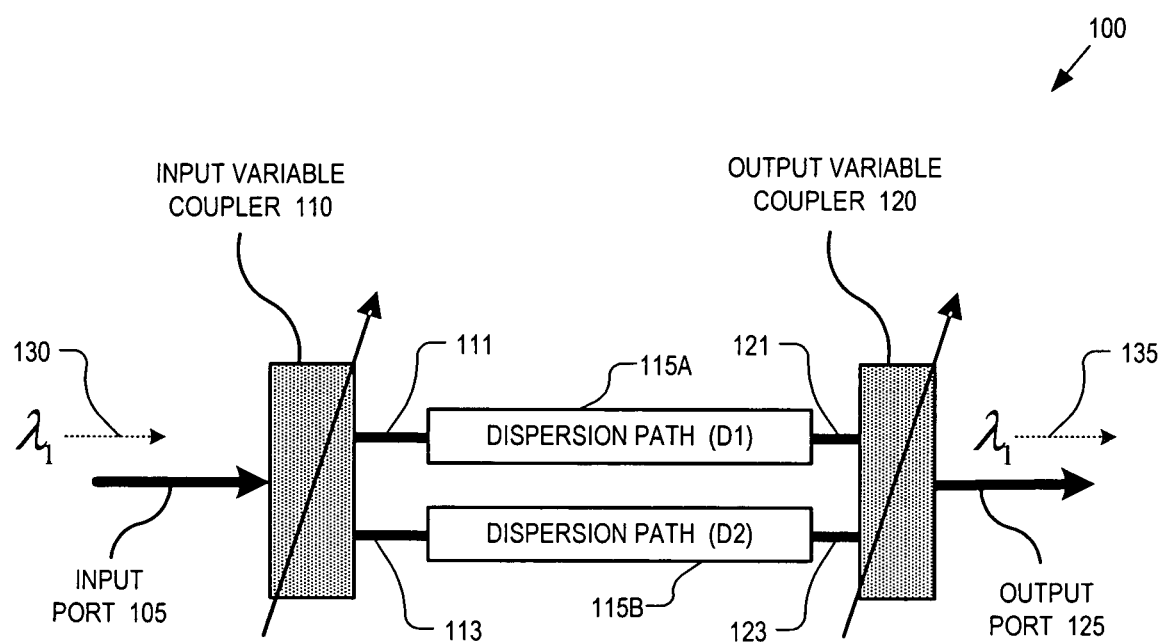
FIG. 1 is a functional block diagram illustrating a bulk dispersion compensator, in accordance with an embodiment of the invention.

FIG. 1 is a functional block diagram illustrating a bulk dispersion compensator 100, in accordance with an embodiment of the invention. The illustrated embodiment of bulk dispersion compensator 100 includes an input port 105, an input variable coupler 110, dispersion paths 115A and 115B (collectively 115), an output variable coupler 120, and an output port 125.

Bulk dispersion compensator 100 is a tunable dispersion compensator that is capable of being tuned in real-time to compensate for a variety of different chromatic dispersions. In one embodiment, bulk dispersion compensator 100 may be integrated onto an integrated optic platform (e.g. polymer, III-V semiconductor material, silica) or a semiconductor substrate (e.g., silicon substrate) and incorporated into an optical receiver (or repeater). In the illustrated embodiment, bulk dispersion compensator 100 is configured to receive a single channel $\lambda_1$ input signal 130, to be tuned to impart selectable and appropriate dispersion compensation to input signal 130, and to output a dispersion compensated output signal 135. Bulk dispersion compensator 100 is well suited for integration into individual customer site receivers of a metro network.

The components of bulk dispersion compensator 100 interoperate as follows. Input signal 130 received at input port 105 is guided into input variable coupler 110. In the illustrated embodiment, input variable coupler 110 is a one-by-two variable splitter capable of splitting input signal 130 between its outputs 111 and 113 according to a selectable splitting ratio. Based on the selectable splitting ratio, input variable coupler 110 can either direct all optical power of input signal 130 to output 111, all optical power of input signal 130 into output 113, or direct a selectable portion into both outputs 111 and 113.

From outputs 111 and 113, the split input signal 130 is guided along dispersion paths 115A and 115B, respectively. Dispersion path 115A imparts a dispersion compensation function D1 to the split portion of input signal 130 propagated along its branch, while dispersion path 115B imparts a dispersion compensation function D2 to the split portion of input signal 130 propagated along its branch.

Dispersion paths 115A and 115B are coupled to inputs 121 and 123, respectively, of output variable coupler 120. Output variable coupler 120 recombines the dispersion compensated split portions of input signal 130 according to a selectable splitting ratio and outputs a dispersion compensated output signal 135. During operation, to reduce optical loss, the splitting ratio of output variable coupler 120 should be tuned to be substantially equivalent to the splitting ratio of input variable coupler 110. For example, if 20% of the optical power of input signal 130 is directed to dispersion path 115A and 80% of the optical power of input signal 130 is directed to dispersion path 115B, then the splitting ratio of output variable coupler 120 should be set to a similar 20%:80% splitting ratio favoring dispersion path 115B.

In the extreme, if the splitting ratio of input variable coupler 110 is selected to direct all optical power of input signal 130 to dispersion path 115A, then the overall dispersion compensation applied to output signal 135 will equal D1. In the opposite extreme, if the splitting ratio of input variable coupler 110 is selected to direct all optical power of input signal 130 to dispersion path 115B, then the overall dispersion compensation applied will equal D2. By setting the splitting ratio in between these extremes, the overall dispersion compensation applied will range between D1 and D2.

In addition to selectively setting the overall dispersion compensation ranging between D1 and D2, embodiments of the invention include the ability to tune or select the individual dispersion compensation functions D1 and D2 of dispersion paths 115. Dispersion compensation functions D1 and D2 may be configured/preset in advance of operation or tuned during operation in real-time.

Figure 2:
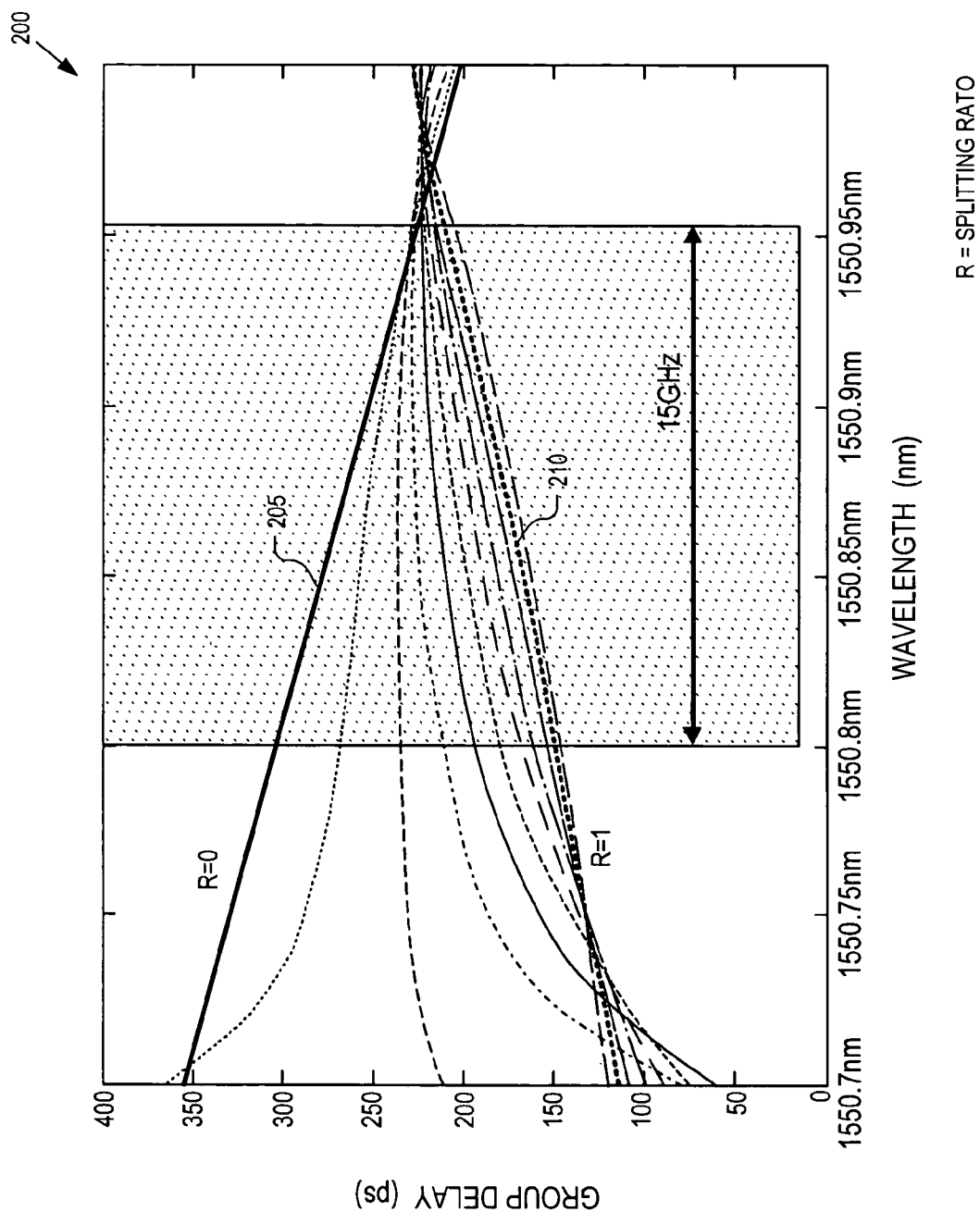
FIG. 2 is a line graph illustrating group delay versus wavelength for various splitting ratios of a bulk dispersion compensator, in accordance with an embodiment of the invention.

FIG. 2 is a line graph 200 illustrating group delay versus wavelength for various splitting ratios 'R' of bulk dispersion compensator 100, in accordance with an embodiment of the invention. Dispersion is the gradient of group delay. Therefore, line 205, which illustrates group delay for a splitting ratio R=0 (e.g., all optical power of input signal 130 directed to dispersion path 115B), has a negative slope and will impart a negative dispersion compensation. Correspondingly, line 210, which illustrates group delay for a splitting ratio R=1 (e.g., all optical power of input signal 130 directed to dispersion path 115A), has a positive slope and will impart a positive dispersion compensation. The other lines illustrate splitting ratios R ranging between 0 and 1 for imparting varying degrees of positive and negative dispersion compensation. Accordingly, embodiments of the invention are capable of selectively imparting both positive and negative dispersion compensation.

Figure 3:
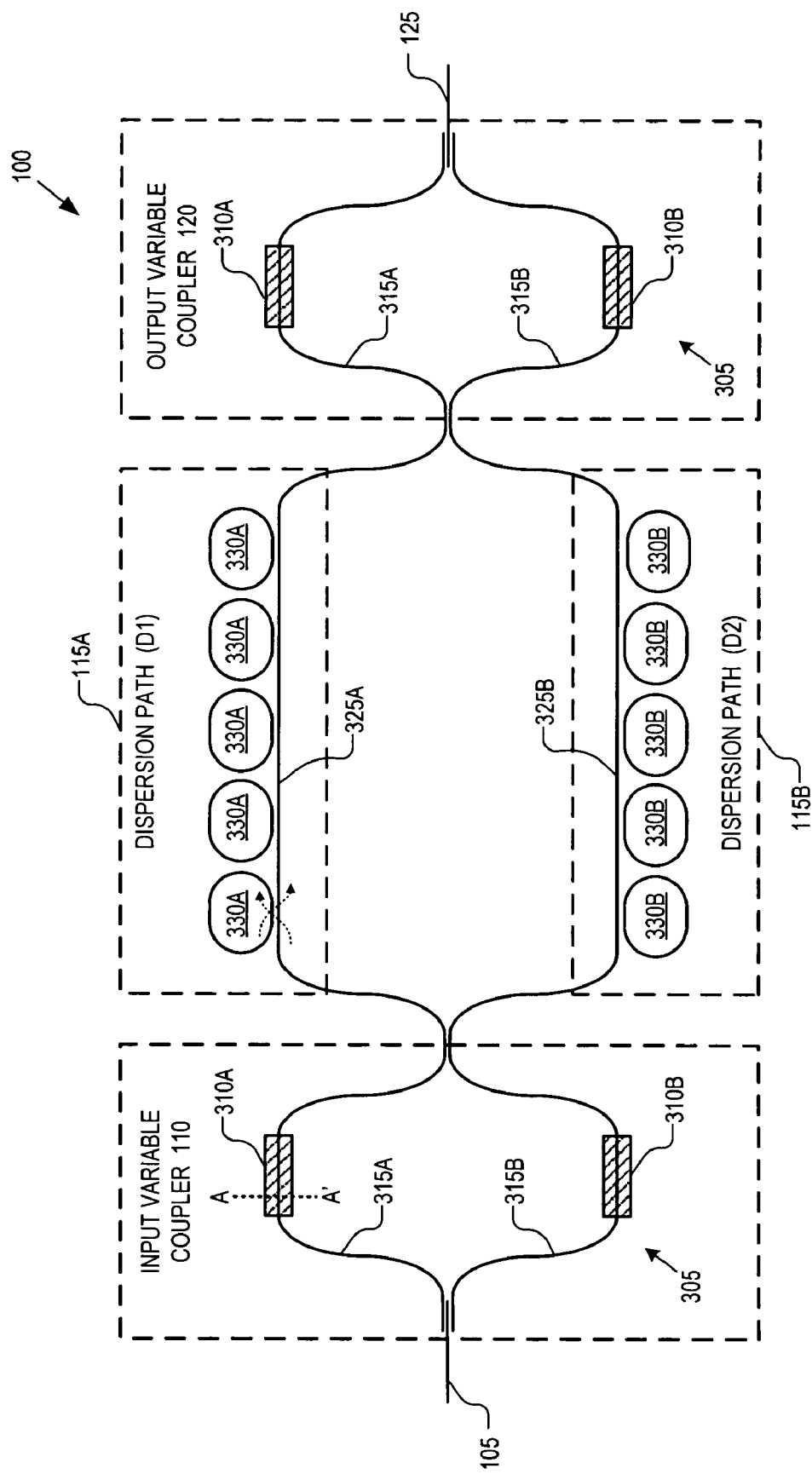
FIG. 3 is a schematic diagram illustrating a dispersion compensator, in accordance with an embodiment of the invention.

FIG. 3 is a schematic diagram illustrating one possible implementation of bulk dispersion compensator 100, in accordance with an embodiment of the invention. However, it should be appreciated that other embodiments may be implemented with other substitute subcomponents. Furthermore, the illustrated embodiment is not necessarily drawn to scale, but rather is merely intended for descriptive purposes.

The illustrated embodiment of input variable coupler 110 includes a symmetrical Mach-Zehnder interferometer ("MZI") 305 having refractive index controllers 310A and 310B coupled to each of its arms 315A and 315B, respectively. Refractive index controllers 310 may be implemented with a variety of devices that affect the optical length of each arm 315 (e.g., resistive thermal heaters, carrier injection via a pn junction, etc.). In one embodiment, only one arm 315 includes a refractive index controller 310, while the other arm does not. MZI 305 is then coupled to each dispersion path 115.

The illustrated embodiment of dispersion path 115A includes a bus waveguide 325A optically coupled to cascaded racetrack resonators 330A. Similarly, dispersion path 115B includes a bus waveguide 325B optically coupled to cascaded racetrack resonators 330B. Although FIG. 3 illustrates each dispersion path 115 as including five racetrack resonators 330, embodiments of dispersion paths 115 may include more or less racetrack resonators.

Three primary factors affect the performance of racetrack resonators 330—loss of each racetrack, bias of each racetrack, and coupling strength of each racetrack. The loss of each racetrack resonator 330 is determined by its radius of curvature (too small and light will bleed out), material absorption, and scattering due to imperfections in the sidewalls and lattice structures of each racetrack resonator 330. In one embodiment, racetrack resonators 330 have a radius of curvature R1 equal to approximately 200 μm. To bias each racetrack resonator 330, its resonance condition may be altered by changing its optical length via thermal control, charge carrier injection, or otherwise. In one embodiment, racetrack resonators 330 include refractive index controllers to tune or bias the individual racetrack resonators 330 to resonate at different wavelengths. Finally, the magnitude of dispersion imparted by each racetrack resonator 330 may be manipulated by controlling the coupling strength of each racetrack resonator 330 to it corresponding bus waveguide 325. In one embodiment, each racetrack resonator 330 includes a variable coupler to selectively tune its coupling strength to its corresponding bus waveguides 325.

The illustrated embodiment of output variable coupler 120 also includes a symmetrical MZI 305 having refractive index controllers 310A and 310B coupled to each of its arms 315A and 315B. The inputs of each arm 315 are coupled to a corresponding dispersion path 115 to receive the dispersion compensated split portions of input signal 130. Finally, the output of output variable coupler 120 combines the dispersion compensated output signal 135 onto output port 125.

Figure 4A:
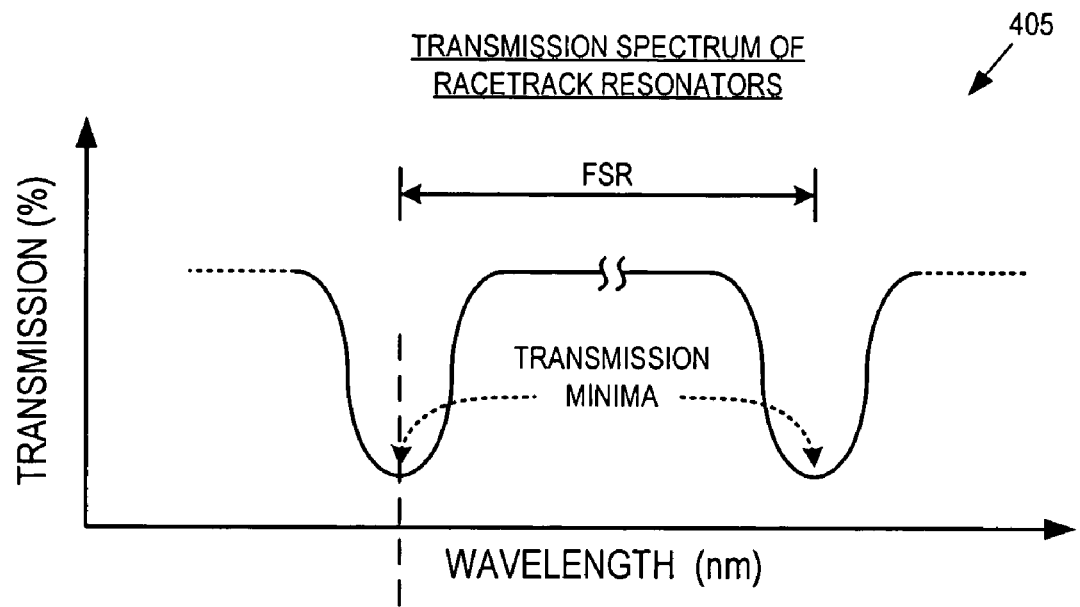
FIG. 4A is a line graph illustrating a transmission spectrum of a racetrack resonator, in accordance with an embodiment of the invention.
Figure 4B:
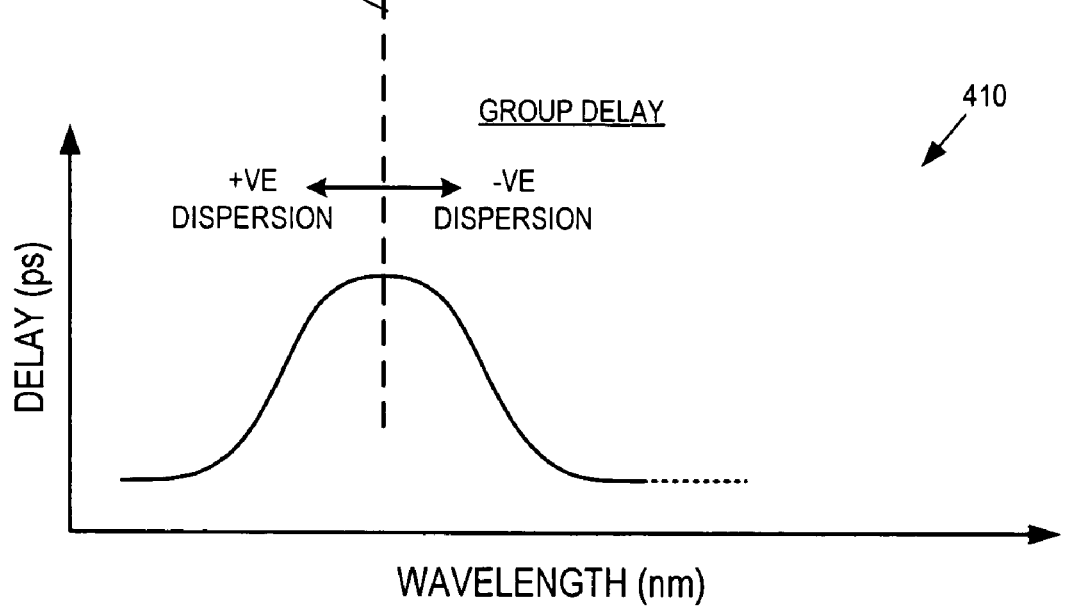
FIG. 4B is a line graph illustrating group delay imparted by a racetrack resonator, in accordance with an embodiment of the invention.

FIGS. 4A and 4B illustrate how each racetrack resonator 330 operates to impart dispersion compensation, in accordance with an embodiment of the invention. FIG. 4A is a line graph 405 illustrating a transmission spectrum of a single racetrack resonator 330, while FIG. 4B is a line graph 410 illustrating a group delay of input signal 130 propagating through a single racetrack resonator 330.

As illustrated in FIG. 4A, the transmission spectrum of each racetrack resonator 330 resembles an inverted Gaussian, which harmonically repeats itself. A transmission minimum resides at the trough of each inverted Gaussian, with the separation distance between adjacent transmission minima equaling the free spectral range ("FSR") of the racetrack resonator 330. The transmission minimum can be translated towards longer or shorter wavelengths by changing the refractive index of the racetrack resonator (i.e., biasing the racetrack resonator).

The wavelength location of where the transmission minimum aligns on the group delay waveform illustrated in FIG. 4B, will determine the magnitude and sign (i.e., positive or negative) of the dispersion compensation imparted by a particular racetrack resonator 330. Since dispersion is the gradient of the group delay waveform, if the transmission minimum is translated to the left of line 415, then the imparted dispersion compensation will be positive, since the slope of the group delay waveform is positive. If the transmission minimum is translated to the right of line 415, then the imparted dispersion compensation will be negative, since the slope of group delay waveform is negative.

Referring to FIGS. 3 and 4A, by biasing racetrack resonators 330A such that their transmission spectrums overlap, then a smooth dispersion compensation function D1 can be achieved. For example, each racetrack resonator 330A could be biased such that its inverted Gaussian waveform overlaps the inverted Gaussian waveform of at least one other racetrack resonator 330A. Racetrack resonators 330B could be biased in a similar manner. When light propagates along bus waveguides 325, those spectral components matching a resonance condition (i.e., resonance wavelength) of a particular racetrack resonator 330, will couple into the particular racetrack resonator 330 and become temporarily trapped. In this manner, racetrack resonators 330 can be tuned to affect specific spectral components in a selectable manner. By cascading several racetrack resonators 330 each tuned to a specified resonance wavelength with overlapping transmission spectrums, a smooth desired dispersion compensation function can be achieved.

Figure 5:
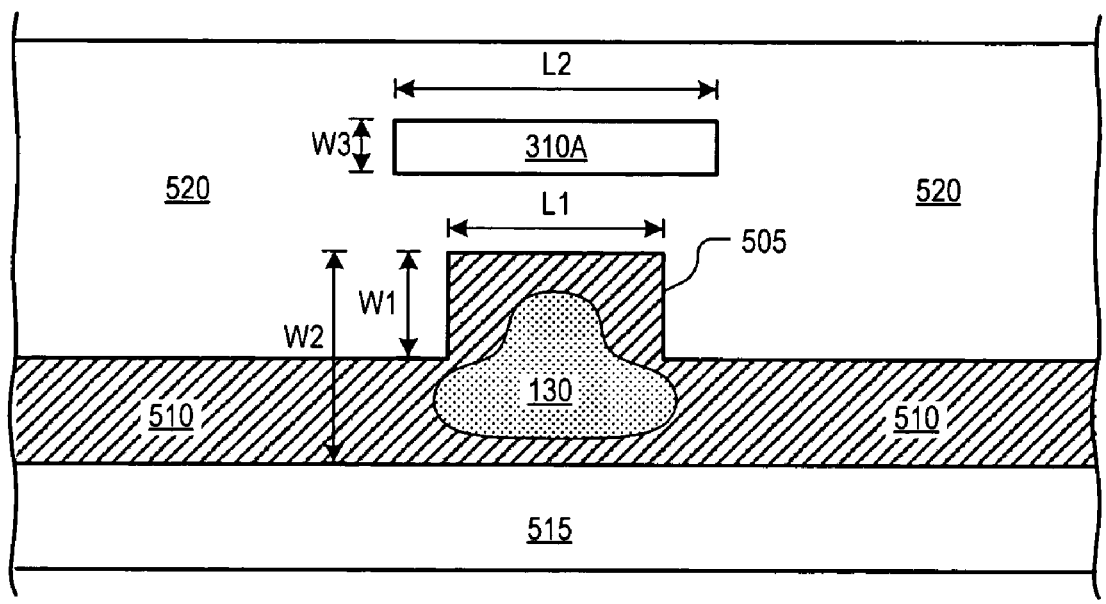
FIG. 5 is a cross-sectional view of a waveguide, in accordance with an embodiment of the invention.

FIG. 5 is a cross-sectional view of waveguide arm 315A along line A-A' in FIG. 3, in accordance with an embodiment of the invention. The illustrated embodiment of waveguide arm 315A is a rib waveguide including a rib section 505 and slab section 510. In one embodiment, all waveguide sections of bulk dispersion compensator 100 include a rib waveguide cross-section. In other embodiments, other waveguide cross-sectional geometries may be used. A demonstrative embodiment is fabricated using $SiO_2$ for material layers 515 and 520, Si for rib section 505, and Si for slab section 510. In one demonstrative embodiment, the physical dimensions are as follows: $L1 \cong 1.5$ μm, $W1 \cong 0.75$ μm, $W2 \cong 1.5$ μm, $L2 \cong 2.0$ μm, $W3 \cong 0.5$ μm.

Figure 6:
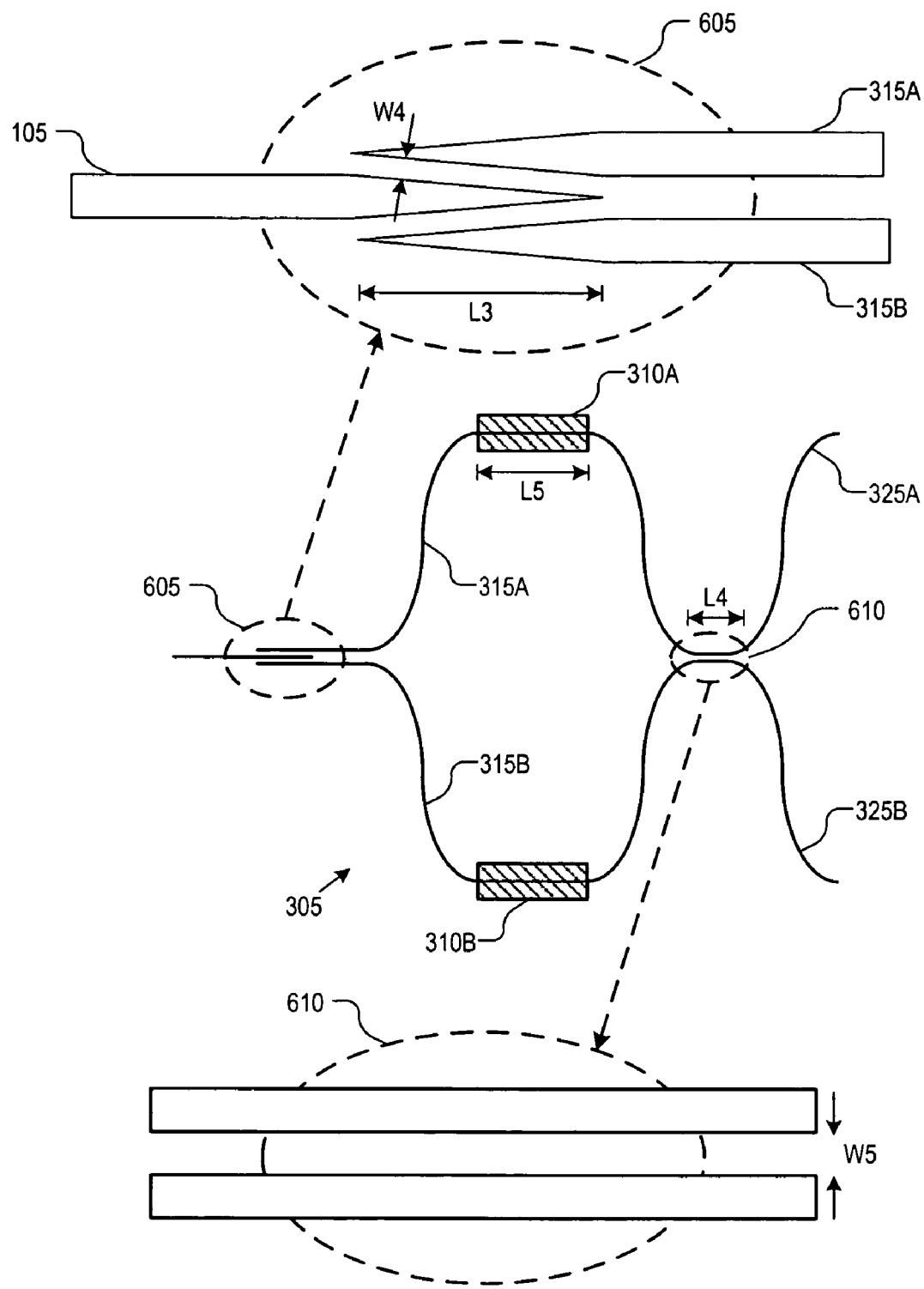
FIG. 6 is a schematic diagram illustrating a splitter portion of a variable coupler and an evanescent mixing portion of the variable coupler, in accordance with an embodiment of the invention.

FIG. 6 is a schematic diagram illustrating a splitter portion 605 and an evanescent mixing portion 610 of input variable coupler 110, in accordance with an embodiment of the invention. As a reminder, FIG. 6 is not drawn to scale. In a demonstrative embodiment of MZI 305, where refractive index controllers 310 are resistive heaters, length $L5 \cong 1.0$ mm.

Splitter portion 605 may be implemented with a variety of optical splitting devices including a regular Y-splitter, an evanescent splitter (illustrated), a one-by-two multi-mode interference ("MMI") splitter, or the like. In one demonstrative embodiment, the separation width $W4 \cong 0.65$ μm and the interaction length $L3 \cong 750$ μm. Other dimensions may be used.

Evanescent mixing portion 610 is implemented by bringing the split portions of input signal 130 together for a fixed interaction length so that the two waves can evanescently mix. By adjusting the optical lengths of the two waveguide arms 315A and 315B of MZI 305, a relative phase difference between the two split portions of input signal 130 is induced. Based on this phase difference, the two split portions can be selectively guided either entirely into bus waveguide 325A, entirely into bus waveguide 325B, or partially into both bus waveguides 325A and 325B. For example, if the relative phase difference is $\pi/2$, then all optical energy is directed into bus waveguide 325A; however, if the relative phase difference is $3\pi/2$, then all optical energy is directed into bus waveguide 325B. In the demonstrative embodiment, the separation width $W5 \cong 0.8$ μm and an interaction length $L4 \cong 230$ μm. Other dimensions may be used.

FIG. 7A is a schematic diagram illustrating a racetrack resonator 705 coupled to bus waveguide 325A via evanescent coupling, in accordance with an embodiment of the invention. Racetrack resonator 705 is one possible embodiment of racetrack resonators 330. The illustrated embodiment of racetrack resonator 705 includes an evanescent coupling section 710 to couple optical signals to/from bus waveguide 325A. In one demonstrative embodiment, evanescent coupling section 710 has an interaction length $L6 \cong 490$ μm and a separation distance $W6 \cong 0.8$ μm, refractive index controller 715 has a length $L7 \cong 1.0$ mm, and radius $R1 \cong 200$ μm. Other dimensions may be used.

FIG. 7B is a schematic diagram illustrating a racetrack resonator 720 coupled to bus waveguide 325A via dual evanescent couplers 725 surrounding a tunable MZI 730, in accordance with an embodiment of the invention. Racetrack resonator 720 is one possible embodiment of racetrack resonators 330. Tunable MZI 730 and evanescent couplers 725 enable adjustment of the coupling strength between racetrack resonator 720 and bus waveguide 325A. For example, adjustment of refractive index controller 735 may allow for tunable coupling efficiencies ranging from 5% to 95% between bus waveguide 325A and racetrack resonator 720. Although FIG. 7B illustrates MZI 730 as including only a single refractive index controller 735 on one arm, other embodiments may include two refractive index controllers, one on each arm. In one demonstrative embodiment, interaction lengths $L8 \cong 230$ μm, separation distance $W6 \cong 0.8$ μm, length $L7 \cong 1.0$ mm, and radius $R1 \cong 200$ μm. Other dimensions may be used.

FIG. 7C is a schematic diagram illustrating a racetrack resonator 740 coupled to bus waveguide 325A via dual multi-mode interference ("MMI") couplers 745 surrounding tunable MZI 730, in accordance with an embodiment of the invention. Racetrack resonator 740 is one possible embodiment of racetrack resonators 330. Tunable MZI 730 and MMI couplers 745 enable adjustment of the coupling strength between racetrack resonator 740 and bus waveguide 325A. MMI couplers 745 operate as two-by-two optical couplers and tunable MZI 730 operates to adjust the splitting ratio to guide a selectable amount of light into racetrack resonator 740. In one demonstrative embodiment, length $L9 \cong 458$ μm, width $W7 \cong 10$ μm, and radius $R1 \cong 200$ μm. Other dimensions may be used.

Figure 8:
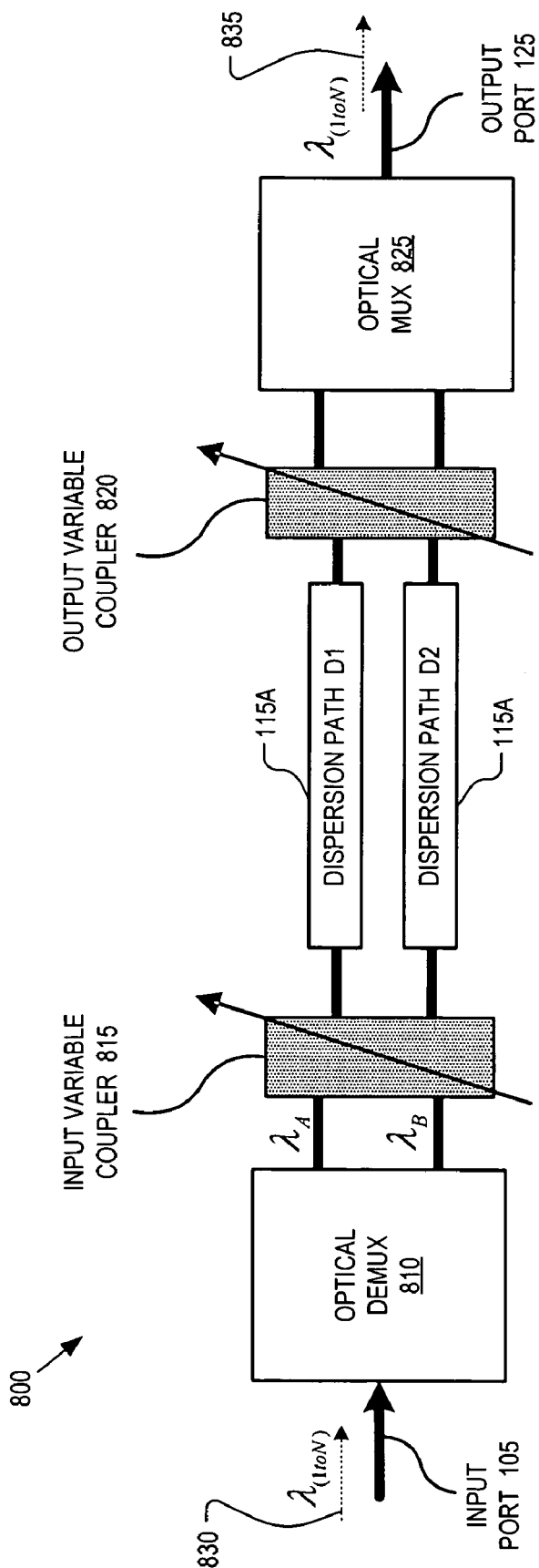
FIG. 8 is a functional block diagram illustrating a dispersion slope compensator, in accordance with an embodiment of the invention.

FIG. 8 is a functional block diagram illustrating a dispersion slope compensator 800, in accordance with an embodiment of the invention. The illustrated embodiment of dispersion slope compensator 800 includes input port 105, an optical demultiplexer 810, an input variable coupler 815, dispersion paths 115A and 115B, an output variable coupler 820, an optical multiplexer 825, and output port 125.

Dispersion slope compensator 800 is a tunable dispersion compensator that is capable of being tuned in real-time to compensate for a variety of different chromatic dispersions. In one embodiment, dispersion slope compensator 800 may be integrated onto an integrated optic platform (e.g. polymer, III-V semiconductor material, silica) or integrated on a semiconductor substrate (e.g., silicon substrate) and incorporated into an optical receiver (or repeater). Dispersion slope compensator 800 is configured to receive a multi-channel $\lambda_{1toN}$ input signal 830, to be tuned to impart selectable and appropriate slope dispersion compensation to input signal 830, and to output a dispersion compensated output signal 835.

In one embodiment, dispersion slope compensator 800 is well suited for use with long haul optical carriers (e.g., transoceanic carriers) having many communication channels (e.g., 100) multiplexed on different carrier wavelengths. Dispersion slope compensator 800 imparts a tunable slope dispersion compensation function across all channels multiplexed on input signal 830. This tunable slope dispersion compensation function is suitable to compensate for residual dispersion remaining after input signal 830 has traversed a length of dispersion compensated fiber. Since dispersion compensated fiber imparts a fixed dispersion compensation function set to compensate for a single wavelength (usually the center carrier wavelength), channels carried on shorter and longer carrier wavelengths generally will have some amount of residual dispersion. Dispersion slope compensator 800 can tune the slope of the dispersion compensation function to correct the residual dispersion at the short and long wavelengths, while leaving the center wavelength substantially undistorted.

The components of dispersion slope compensator 800 interoperate as follows. Input signal 830 received at input port 105 is guided into optical demultiplexer 810. Optical demultiplexer 810 separates multi-channel input signal 830 into at least two groups $\lambda_A$ and $\lambda_B$. $\lambda_A$ includes a first portion of the channels or carrier wavelengths (e.g., short carrier wavelengths), while $\lambda_B$ includes a second portion of the channels (e.g., long carrier wavelengths). Input variable coupler 815 then selectively splits portions of each of these two groups $\lambda_A$ and $\lambda_B$ into dispersion paths 115 according to the tunable splitting ratio. In the illustrated embodiment, input variable coupler 815 is a two-by-two variable splitter capable of splitting optical power from the two groups $\lambda_A$ and $\lambda_B$ of input signal 830 between dispersion paths 115, according to the selectable splitting ratio. Optical power from group $\lambda_A$ may be directed to one or both of dispersion paths 115. Similarly, optical power from group $\lambda_B$ may be directed to one or both of dispersion paths 115, as well. The split portions from each group $\lambda_A$ and $\lambda_B$ are then propagated through dispersion paths 115 to impart the dispersion compensation functions D1 and D2 thereto.

Output variable coupler 820 is coupled to both dispersion paths 115 and recombines (mixes) optical power received from each dispersion path 115 according to the selectable splitting ratio. Output variable coupler 820 outputs the dispersion compensated groups $\lambda_A$ and $\lambda_B$ to optical multiplexer 825. Optical multiplexer 825 then multiplexes the two groups $\lambda_A$ and $\lambda_B$ back together into a single dispersion compensated output signal 835.

Figure 9:
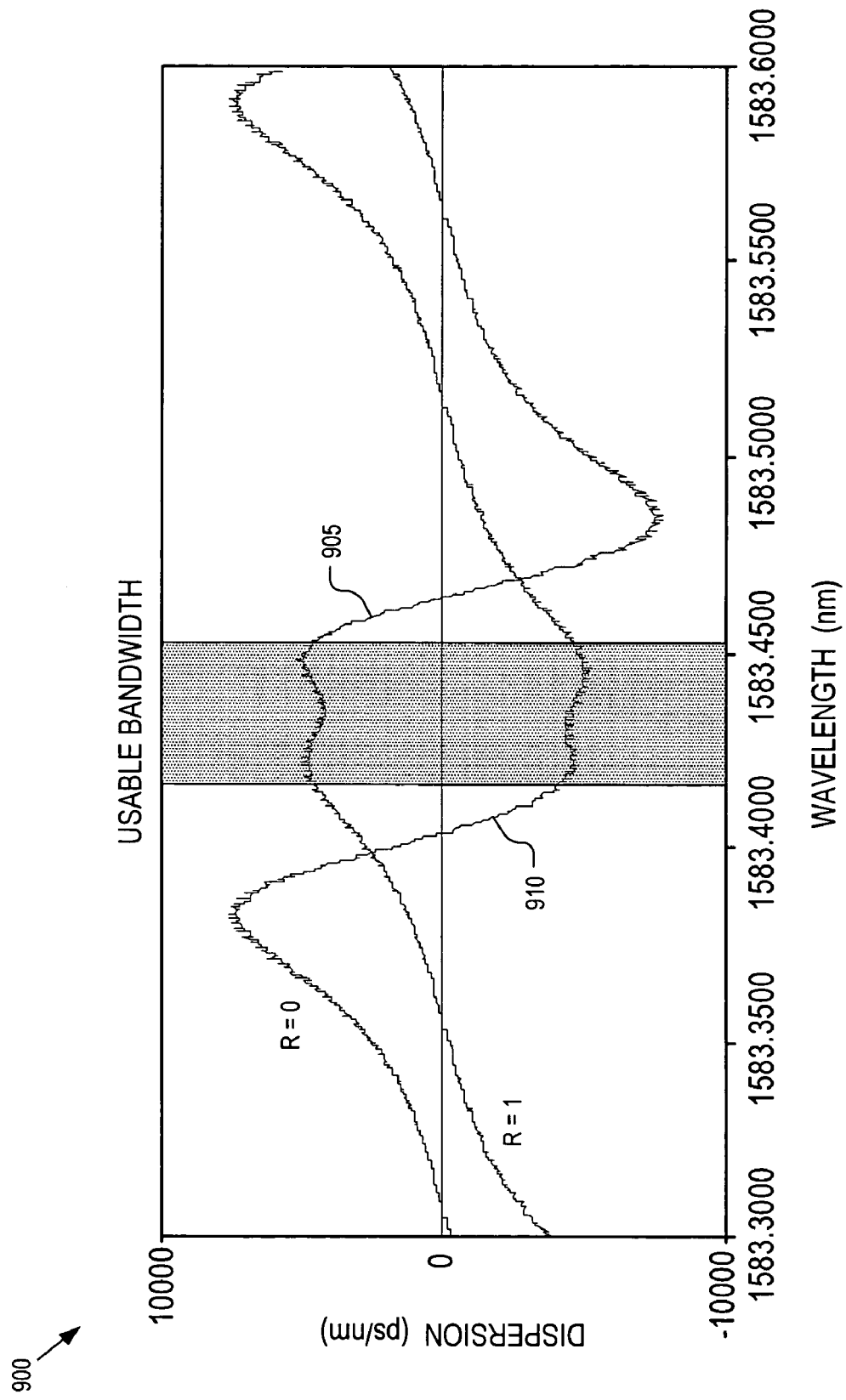
FIG. 9 is a line graph illustrating dispersion compensation versus wavelength for two splitting ratios of a dispersion slope compensator, in accordance with an embodiment of the invention.

FIG. 9 is a line graph 900 illustrating dispersion compensation versus wavelength for two splitting ratios of dispersion slope compensator 800, in accordance with an embodiment of the invention. Line 905 illustrates the imparted dispersion compensation when the splitting ratio R of input and output variable couplers 815 and 825 is set to R=0. Setting the splitting ratio R=0 imparts a positive dispersion compensation over the useful bandwidth delineated by the shading. Line 910 illustrates the imparted dispersion compensation when the splitting ratio R of input and output variable couplers 815 and 825 is set to R=1. Setting the splitting ratio R=1 imparts a negative dispersion compensation over the useful bandwidth. By adjusting the splitting ratio R between these two extreme values, the imparted dispersion compensation can be tuned in real-time to compensate for a variety of residual dispersion profiles.

Figure 10:
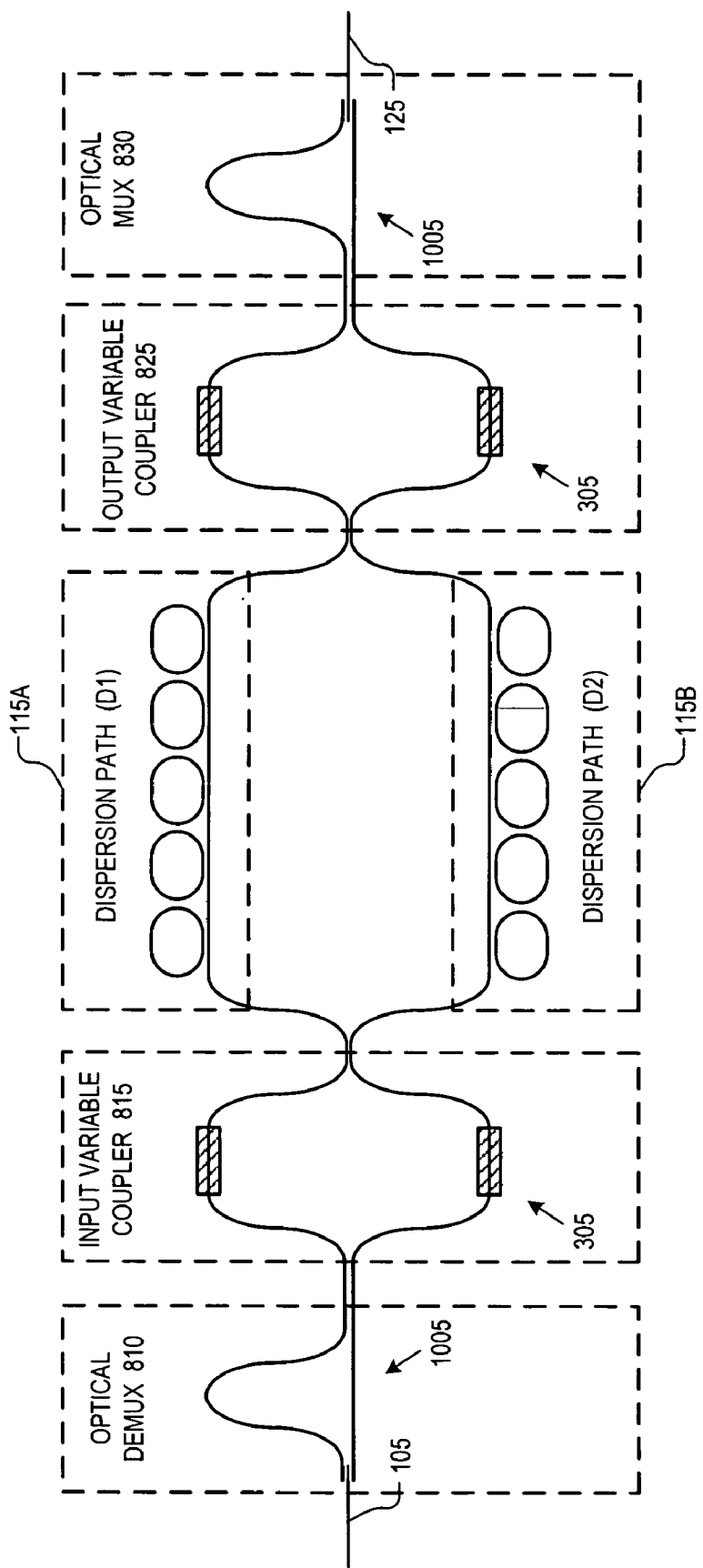
FIG. 10 is a schematic diagram illustrating a dispersion slope compensator, in accordance with an embodiment of the invention.

FIG. 10 is a schematic diagram illustrating one possible implementation of dispersion slope compensator 800, in accordance with an embodiment of the invention. However, it should be appreciated that other embodiments may be implemented with other substitute subcomponents. Furthermore, the illustrated embodiment is not necessarily drawn to scale, but rather is merely intended for descriptive purposes.

The illustrated embodiment of optical demultiplexer 810 includes an asymmetrical MZI 1005. In one embodiment, the upper branch of asymmetrical MZI 1005 is approximately 20 μm longer than the bottom branch. Asymmetrical MZI 1005 includes a splitting portion and mixing portion with similar dimensions as splitting portion 605 and evanescent mixing portion 610 of MZI 305 (see FIG. 6), respectively. In one embodiment, optical multiplexer 830 is similar to optical demultiplexer 810, but mirrored.

In the illustrated embodiment, input variable couple 815 and output variable coupler 825 include tunable MZIs 305 (see FIG. 6). Similarly, dispersion paths 115 are coupled and operate in a similar manner as described above in connection with bulk dispersion compensator 100.

Figure 11:
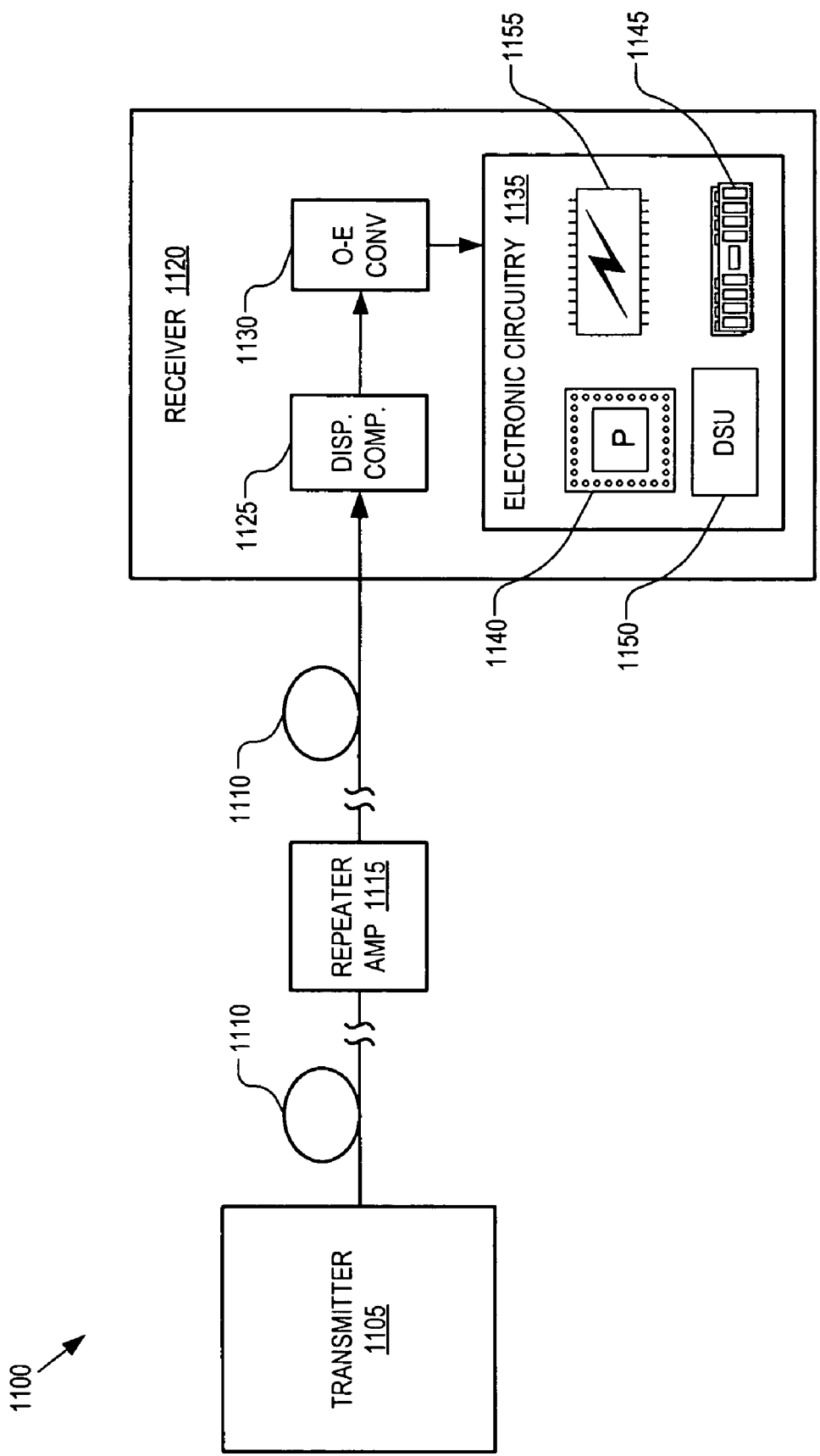
FIG. 11 is a functional block diagram illustrating an optical communication system implemented with a dispersion compensator integrated into a receiver, in accordance with an embodiment of the invention.

FIG. 11 is a functional block diagram illustrating an optical communication system 1100 implemented with a dispersion compensator integrated into a receiver, in accordance with an embodiment of the invention. The illustrated embodiment of optical communication system 1100 includes a transmitter 1105, a communication channel 1110 (e.g., optic fiber), a repeater amplifier 1115, and a receiver 1120. The illustrated embodiment of receiver 1120 includes a dispersion compensator 1125 (e.g., bulk dispersion compensator 100 or dispersion slope compensator 800), an optical-to-electrical ("O-E") converter 1130 (e.g., photo detector), and electronic circuitry 1135. In one embodiment, dispersion compensator 1125 and O-E converter 1130 may be integrated onto a single semiconductor die. In one embodiment, all the components of receiver 1120 may all be integrated onto one semiconductor die. If communication channel 1110 is a customer link of metro network, then dispersion compensator 1125 may be implemented as bulk dispersion compensator 100. However, if communication channel 1110 is a long haul carrier link, then dispersion compensator 1125 may be implemented as dispersion slope compensator 800.

During operation, transmitter 1105 converts electrical data to optical data and launches the optical data onto communication channel 1110. In one embodiment, the optical data is modulated onto one or more carrier wavelengths centered about the 1.55 μm wavelength. Repeater 1115 receives the optical data, amplifies it, and then retransmits it along communication channel 1110. While propagating along communication channel 1110, the optical data may degrade due to chromatic dispersion. When the optical data is received at receiver 1120, its dispersion is compensated by dispersion compensator 1125, converted back to the electrical realm by O-E converter 1130, and then manipulated by electronic circuitry 1135. In one embodiment, dispersion compensator 1125 includes control circuitry to automatically adapt, in real-time, its dispersion compensation to optimize the restoration of the received optical data.

The illustrated embodiment of electronic circuitry 1135 includes one or more processors 1140, system memory 1145, a data storage unit ("DSU") 1150, and non-volatile ("NV") memory 1155. The elements of electronic circuitry 1135 are interconnected as follows. Processor(s) 1140 is communicatively coupled to system memory 1145, DSU 1150, and NV memory 1155 to send and to receive instructions or data thereto/therefrom. In one embodiment, NV memory 1155 is a flash memory device. In other embodiments, NV memory 1155 includes any one of read only memory ("ROM"), programmable ROM, erasable programmable ROM, electrically erasable programmable ROM, or the like. In one embodiment, system memory 1145 includes random access memory ("RAM"), such as dynamic RAM ("DRAM"), synchronous DRAM ("SDRAM"), double data rate SDRAM ("DDR SDRAM"), static RAM ("SRAM"), and the like. DSU 1150 represents any storage device for software data, applications, and/or operating systems, but will most typically be a non-volatile storage device. DSU 1150 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   an input variable optical coupler including output ports, the input variable optical coupler coupled to selectively split portions of an optical signal received from an optical input port into each of the output ports;
   optical dispersion paths each coupled to one of the output ports of the input variable optical coupler to impart dispersion compensation to each of the split portions of the optical signal, wherein each of the optical dispersion paths includes a bus waveguide and a plurality of cascaded racetrack resonators optically coupled along the bus waveguide;
   an output variable optical coupler including input ports each coupled to one of the optical dispersion paths to selectively combine the split portions of the optical signal; and
   an optical output port coupled to the output variable optical coupler to output a dispersion compensated optical signal.

2. The apparatus of claim 1, wherein the optical dispersion paths comprise tunable optical dispersion paths capable of imparting a selectable dispersion compensation.

3. The apparatus of claim 2, wherein the racetrack resonators have overlapping transmission spectrums.

4. The apparatus of claim 2, wherein the tunable optical dispersion paths each further include a plurality of heaters each thermally coupled to one of the racetrack resonators to thermally adjust a transmission minimum of the corresponding racetrack resonator.

5. The apparatus of claim 2, wherein the tunable optical dispersion paths each further include a plurality of carrier injection units each to inject charge carriers into one of the racetrack resonators to adjust a transmission minimum of the corresponding racetrack resonator.

6. The apparatus of claim 2, wherein the racetrack resonators are evanescently coupled to the bus waveguide.

7. The apparatus of claim 2, wherein each of the racetrack resonators includes:
   a Mach-Zehnder interferometer ("MZI") disposed along the bus waveguide;
   first and second evanescent couplers disposed along the bus waveguide on either side of the MZI; and
   a refractive index controller disposed on at least one branch of the MZI, the refractive index controller configured to selectively adjust an index of refraction of the at least one branch.

8. The apparatus of claim 2, wherein each of the racetrack resonators includes:
   a Mach-Zehnder interferometer ("MZI") disposed along the bus waveguide;
   first and second multi-mode interference ("MMI") modules disposed along the bus waveguide on either side of the MZI; and
   a refractive index controller disposed on at least one branch of the MZI, the refractive index controller configured to selectively adjust an index of refraction of the at least one branch.

9. The apparatus of claim 1, wherein the input and output variable optical couplers each include:
   a Mach-Zehnder interferometer ("MZI") having substantially equal length branches; and
   refractive index controllers coupled to each of the branches of the MZI to selectively adjust indexes of refraction of the branches.

10. The apparatus of claim 1, wherein the apparatus comprises a bulk dispersion compensator, wherein the input variable optical coupler comprises a one-by-two tunable splitter, and wherein the output variable optical coupler comprises a two-by-one tunable combiner.

11. The apparatus of claim 1, wherein the input variable optical coupler, the optical dispersion paths, and the output variable optical coupler are integrated on any one of a semiconductor substrate, a III-V semiconductor substrate, a silicon substrate, a polymer substrate, or a glass substrate.

12. An apparatus comprising:
   an input variable optical coupler including output ports, the input variable optical coupler coupled to selectively split portions of an optical signal received from an optical input port into each of the output ports;
   optical dispersion paths each coupled to one of the output ports of the input variable optical coupler to impart dispersion compensation to each of the split portions of the optical signal;
   an output variable optical coupler including input ports each coupled to one of the optical dispersion paths to selectively combine the split portions of the optical signal;

an optical output port coupled to the output variable optical coupler to output a dispersion compensated optical signal;

an optical demultiplexer disposed between the optical input port and the input variable optical coupler; and an optical multiplexer disposed between the output variable optical coupler and the optical output port.

13. The apparatus of claim 12, wherein the input and output variable optical couplers comprise two-by-two tunable couplers.

14. The apparatus of claim 13, wherein the optical demultiplexer and the optical multiplexer comprise asymmetrical Mach-Zehnder interferometers.

15. A method of dispersion compensation, comprising:

splitting an optical signal into first and second portions based on a first tunable splitting ratio;

applying a first dispersion compensation function to the first portion by propagating the first portion along a first dispersion path;

applying a second dispersion compensation function to the second portion by propagating the second portion along a second dispersion path;

recombining the first and second portions based on a second tunable splitting ratio;

outputting a dispersion compensated version of the optical signal; and adjusting an overall dispersion compensation between the first dispersion compensation function and the second dispersion compensation function by changing the first and second splitting ratios.

16. The method of claim 15, wherein the first tunable splitting ratio and the second tunable splitting ratio are selected to be substantially equivalent.

17. The method of claim 15, wherein the first dispersion compensation function is represented by D1 and the second dispersion compensation function is represented by D2, and wherein D2=−D1.

18. The method of claim 15, wherein applying the first and second dispersion compensation functions to the first and second portions, respectively, comprises:

propagating the first portion along a first bus waveguide optically coupled to a first plurality of cascaded racetrack resonators; and propagating the second portion along a second bus waveguide optically coupled to a second plurality of cascaded racetrack resonators.

19. A method of dispersion compensation, comprising:

demultiplexing a multi-channel optical signal into two input groups of channels;

coupling a first portion from each of the two input groups of channels into a first dispersion path and a second portion from each of the two input groups of channels into a second dispersion path, based on a first tunable coupling ratio;

applying a first dispersion compensation function to the first portion by propagating the first portion along the first dispersion path;

applying a second dispersion compensation function to the second portion by propagating the second portion along the second dispersion path;

coupling the first and second portions from the first and second dispersion paths into two output groups of channels, based on a second tunable coupling ratio; and multiplexing the two output groups into a dispersion compensated multi-channel optical signal.

20. The method of claim 19, wherein the first tunable coupling ratio and the second tunable coupling ratio are selected to be substantially equivalent.

21. The method of claim 19, wherein applying the first dispersion compensation function to the first portion further comprises propagating the first portion along a first bus waveguide coupled to a first plurality of cascaded racetrack resonators, and wherein applying the second dispersion compensation function to the second portion further comprises propagating the second portion along a second bus waveguide coupled to a second plurality of cascaded racetrack resonators.

22. The method of claim 21, further comprising:

tuning the first dispersion compensation function by adjusting a first transmission minimum of at least one of the first plurality of racetrack resonators; and tuning the second dispersion compensation function by adjusting a second transmission minimum of at least one of the second plurality of racetrack resonators.

23. The method of claim 19, further comprising:

adjusting an overall dispersion compensation applied to the multi-channel optical signal by changing the first and second splitting ratios.

24. An optical receiver, comprising:

a processor coupled to synchronous dynamic random access memory ("SDRAM"), the processor to store and manipulate electrical data in the SDRAM;

an optical-to-electrical ("O-E") converter coupled to the processor to convert optical data to the electrical data; and a dispersion compensation unit coupled to the O-E converter, the dispersion compensation unit including:

an input variable optical coupler including output ports, the input variable optical coupler coupled to selectively split portions of the optical data into each of the output ports;

optical dispersion paths each coupled to one of the output ports of the input variable optical coupler to impart dispersion compensation to each of the split portions of the optical data, wherein each of the optical dispersion paths includes a bus waveguide and a plurality of cascaded racetrack resonators optically coupled along the bus waveguide; and an output variable optical coupler including input ports each coupled to one of the optical dispersion paths to selectively combine the split portions of the optical data.

25. The optical receiver of claim 24, wherein the dispersion compensation unit comprises a bulk dispersion compensator, wherein the input variable optical coupler comprises a one-by-two tunable splitter, and wherein the output variable optical coupler comprises a two-by-one tunable combiner.

26. The optical receiver of claim 24, wherein the dispersion compensation unit comprises a dispersion slope compensator, the dispersion slope compensator further comprising:

an optical demultiplexer disposed between the optical input port and the input variable optical coupler; and an optical multiplexer disposed between the output variable optical coupler and the optical output port.

27. The optical receiver of claim 24, wherein the input variable optical coupler, the optical dispersion paths, and the output variable optical coupler are integrated on any one of a semiconductor substrate, a III-V semiconductor substrate, a silicon substrate, a polymer substrate, or a glass substrate.

* * * * *